(12) United States Patent
Chua et al.

(10) Patent No.: US 11,904,986 B2
(45) Date of Patent: Feb. 20, 2024

(54) MECHANICAL TRIGGERS AND TRIGGERING METHODS FOR SELF-DESTRUCTING FRANGIBLE STRUCTURES AND SEALED VESSELS

(71) Applicant: Palo Alto Research Center Incorporated, Palo Alto, CA (US)

(72) Inventors: Christopher L. Chua, San Jose, CA (US); Norine E. Chang, Menlo Park, CA (US); Julie Ann Bert, Palo Alto, CA (US); Scott J. Limb, Palo Alto, CA (US); Steven Neltner, San Carlos, CA (US); Eric Cocker, Redwood City, CA (US)

(73) Assignee: XEROX CORPORATION, Norwalk, CT (US)

( * ) Notice: Subject to any disclaimer, the term of this patent is extended or adjusted under 35 U.S.C. 154(b) by 652 days.

(21) Appl. No.: 17/128,714

(22) Filed: Dec. 21, 2020

(65) Prior Publication Data
US 2022/0194524 A1    Jun. 23, 2022

(51) Int. Cl.
| B63B 22/26 | (2006.01) |
| B63B 59/04 | (2006.01) |
| F16K 17/40 | (2006.01) |
| B26F 3/06 | (2006.01) |

(52) U.S. Cl.
CPC ............... *B63B 22/26* (2013.01); *B26F 3/06* (2013.01); *B63B 59/04* (2013.01); *F16K 13/04* (2013.01)

(58) Field of Classification Search
CPC . F16K 13/04; B26F 3/06; B63B 22/26; B63B 59/04

USPC ........................................................ 225/93.5
See application file for complete search history.

(56) References Cited

U.S. PATENT DOCUMENTS

| 1,839,884 | A |   | 1/1932 | Loepsinger |
| 2,529,210 | A |   | 11/1950 | Butler |
| 3,397,278 | A |   | 8/1968 | Pomerant |
| 3,601,114 | A |   | 8/1971 | Cook |
| 3,633,596 | A | * | 1/1972 | Gerber .................... F16K 13/04 |
|   |   |   |   | 222/5 |

(Continued)

FOREIGN PATENT DOCUMENTS

| CN | 103434475 | 12/2013 |
| DE | 102004015546 | 10/2005 |

(Continued)

OTHER PUBLICATIONS

Chua, U.S. Appl. No. 17/125,644, filed Dec. 17, 2020.
Limb et al., U.S. Appl. No. 16/537,258, filed Aug. 9, 2019.

*Primary Examiner* — Omar Flores Sanchez
(74) *Attorney, Agent, or Firm* — Mueting Raasch Group

(57) ABSTRACT

An apparatus includes a structure comprising a predetermined breakable region and a mechanical actuator disposed at or proximate the predetermined breakable region. The mechanical actuator comprises an impact member coupled to a spring arrangement, and a restraint member operably coupled to the spring arrangement. A trigger source is operably coupled to an electrical power source. The trigger source, in response to receiving current from the electrical power source, is configured to release or break the restraint member so as to allow the spring arrangement to forcibly move the impact member into contact with, and break, the predetermined breakable region.

28 Claims, 9 Drawing Sheets

(56) References Cited

U.S. PATENT DOCUMENTS

| | | |
|---|---|---|
| 3,666,967 A | 5/1972 | Keister et al. |
| 3,673,667 A | 7/1972 | Loewenstein et al. |
| 3,716,068 A * | 2/1973 | Addison ................ E21B 34/02 |
| | | 72/464 |
| 3,882,323 A | 5/1975 | Smolker |
| 4,102,664 A | 7/1978 | Dumbaugh, Jr. |
| 4,139,359 A | 2/1979 | Johnson et al. |
| 4,155,307 A | 5/1979 | Humphreys et al. |
| 4,471,895 A | 9/1984 | Lisec, Jr. |
| 4,558,622 A | 12/1985 | Tausheck |
| 4,598,274 A | 7/1986 | Holmes |
| 4,673,453 A | 6/1987 | Georgii |
| 4,739,555 A | 4/1988 | Jurgens |
| 5,374,564 A | 12/1994 | Bruel |
| 5,584,219 A | 12/1996 | Dunn et al. |
| 5,791,056 A | 8/1998 | Messina |
| 6,327,978 B1 | 12/2001 | Turano et al. |
| 6,418,628 B1 | 7/2002 | Steingass |
| 6,441,354 B1 | 8/2002 | Seghatol et al. |
| 6,494,225 B1 * | 12/2002 | Olewicz .................. F16K 7/045 |
| | | 251/9 |
| 6,926,204 B2 | 8/2005 | Vacherand et al. |
| 7,002,517 B2 | 2/2006 | Noujeim |
| 7,025,013 B1 * | 4/2006 | Staerzl .................... C23F 13/00 |
| | | 114/222 |
| 7,068,254 B2 | 6/2006 | Yamazaki et al. |
| 7,153,758 B2 | 12/2006 | Hata et al. |
| 7,554,085 B2 | 6/2009 | Lee |
| 7,880,248 B1 | 2/2011 | Pham et al. |
| 7,896,988 B2 | 3/2011 | Mohler |
| 7,944,049 B2 | 5/2011 | Fujii |
| 8,130,072 B2 | 3/2012 | De Bruyker et al. |
| 8,448,554 B2 | 5/2013 | Koide et al. |
| 8,495,944 B2 | 7/2013 | Koide et al. |
| 8,671,814 B2 | 3/2014 | Fujiwara et al. |
| 8,695,263 B2 | 4/2014 | Murray |
| 8,740,030 B2 | 6/2014 | Purdy et al. |
| 9,154,138 B2 | 10/2015 | Limb et al. |
| 9,294,098 B2 | 3/2016 | Shah et al. |
| 9,356,603 B2 | 5/2016 | Limb et al. |
| 9,577,047 B2 | 2/2017 | Chua et al. |
| 9,630,870 B2 | 4/2017 | Zhao et al. |
| 9,691,873 B2 | 6/2017 | Rogers et al. |
| 9,780,044 B2 | 10/2017 | Limb et al. |
| 9,790,128 B2 | 10/2017 | Garner et al. |
| 10,012,250 B2 | 7/2018 | Limb et al. |
| 10,026,579 B2 | 7/2018 | Whiting et al. |
| 10,026,651 B1 | 7/2018 | Limb |
| 10,224,297 B2 | 3/2019 | Chua et al. |
| 10,308,543 B2 | 6/2019 | Lee |
| 10,332,717 B2 | 6/2019 | Whiting et al. |
| RE47,570 E | 8/2019 | Limb et al. |
| 10,648,491 B2 | 5/2020 | Limb et al. |
| 10,717,669 B2 | 7/2020 | Murphy et al. |
| 2003/0089755 A1 | 5/2003 | Peers-Smith et al. |
| 2004/0031966 A1 | 2/2004 | Forrest et al. |
| 2004/0222500 A1 | 11/2004 | Aspar et al. |
| 2005/0061032 A1 | 3/2005 | Yoshizawa |
| 2005/0082331 A1 | 4/2005 | Yang |
| 2005/0084679 A1 | 4/2005 | Sglavo et al. |
| 2005/0176573 A1 | 8/2005 | Thoma et al. |
| 2006/0138798 A1 | 6/2006 | Oehrlein |
| 2006/0270190 A1 | 11/2006 | Nastasi et al. |
| 2007/0113886 A1 | 5/2007 | Arao et al. |
| 2008/0029195 A1 | 2/2008 | Lu |
| 2008/0311686 A1 | 12/2008 | Morral et al. |
| 2009/0086170 A1 | 4/2009 | El-Ghoroury et al. |
| 2010/0035038 A1 | 2/2010 | Barefoot et al. |
| 2010/0133641 A1 | 6/2010 | Kim |
| 2010/0225380 A1 | 9/2010 | Hsu et al. |
| 2011/0048756 A1 | 3/2011 | Shi et al. |
| 2011/0089506 A1 | 4/2011 | Hoofman et al. |
| 2011/0183116 A1 | 7/2011 | Hung et al. |
| 2012/0052252 A1 | 3/2012 | Kohli et al. |
| 2012/0073763 A1 * | 3/2012 | Loy ........................ A61M 39/14 |
| | | 156/750 |
| 2012/0135177 A1 | 5/2012 | Cornejo et al. |
| 2012/0135195 A1 | 5/2012 | Glaesemann et al. |
| 2012/0196071 A1 | 8/2012 | Cornejo et al. |
| 2012/0288676 A1 | 11/2012 | Sondergard et al. |
| 2013/0037308 A1 | 2/2013 | Wang et al. |
| 2013/0082383 A1 | 4/2013 | Aoya |
| 2013/0140649 A1 | 6/2013 | Rogers et al. |
| 2013/0192305 A1 | 8/2013 | Black et al. |
| 2013/0273717 A1 | 10/2013 | Hwang et al. |
| 2014/0060347 A1 | 3/2014 | Sahebkar Yazdi |
| 2014/0091374 A1 | 4/2014 | Assefa et al. |
| 2014/0103957 A1 | 4/2014 | Fritz et al. |
| 2014/0266946 A1 | 9/2014 | Bily et al. |
| 2014/0300520 A1 | 10/2014 | Nguyen et al. |
| 2014/0323968 A1 | 10/2014 | Rogers et al. |
| 2014/0339265 A1 * | 11/2014 | Marone ............... A47L 15/4463 |
| | | 337/140 |
| 2015/0001733 A1 | 1/2015 | Karhade et al. |
| 2015/0044445 A1 | 2/2015 | Garner et al. |
| 2015/0076677 A1 | 3/2015 | Ebefors et al. |
| 2015/0089977 A1 | 4/2015 | Li |
| 2015/0102852 A1 | 4/2015 | Limb et al. |
| 2015/0121964 A1 | 5/2015 | Zhao et al. |
| 2015/0229028 A1 | 8/2015 | Bily et al. |
| 2015/0232369 A1 | 8/2015 | Marjanovic et al. |
| 2015/0318618 A1 | 11/2015 | Chen et al. |
| 2015/0348940 A1 | 12/2015 | Woychik et al. |
| 2015/0358021 A1 | 12/2015 | Limb et al. |
| 2015/0372389 A1 | 12/2015 | Chen et al. |
| 2016/0122225 A1 | 5/2016 | Wada et al. |
| 2016/0137548 A1 | 5/2016 | Cabral, Jr. et al. |
| 2017/0036942 A1 | 2/2017 | Abramov et al. |
| 2017/0217818 A1 | 8/2017 | Dumenil et al. |
| 2017/0248246 A1 * | 8/2017 | Valentin ................ F16K 31/025 |
| 2017/0292546 A1 | 10/2017 | Limb et al. |
| 2018/0005963 A1 | 1/2018 | Limb et al. |
| 2018/0033577 A1 | 2/2018 | Whiting et al. |
| 2018/0033742 A1 | 2/2018 | Chua et al. |
| 2018/0114761 A1 | 4/2018 | Chua et al. |
| 2018/0306218 A1 | 10/2018 | Limb et al. |
| 2018/0330907 A1 | 11/2018 | Whiting et al. |
| 2019/0106069 A1 | 4/2019 | Wheeler et al. |
| 2019/0172800 A1 | 6/2019 | Chua et al. |
| 2019/0311872 A1 | 10/2019 | Whiting et al. |
| 2020/0096123 A1 * | 3/2020 | Czechowski ........... F16K 13/04 |
| 2020/0172430 A1 | 6/2020 | Limb et al. |
| 2020/0176200 A1 | 6/2020 | Limb et al. |
| 2020/0191285 A1 * | 6/2020 | Czechowski ........... F17C 13/04 |
| 2020/0308041 A1 | 10/2020 | Murphy et al. |
| 2020/0348112 A1 | 11/2020 | Chua et al. |
| 2021/0190026 A1 * | 6/2021 | Qin ...................... F02M 63/005 |
| 2022/0055722 A1 * | 2/2022 | Gummin ................ B63C 9/1255 |
| 2022/0196169 A1 * | 6/2022 | Chua ...................... B63B 22/18 |

FOREIGN PATENT DOCUMENTS

| | | |
|---|---|---|
| EP | 3086363 | 10/2016 |
| EP | 3316296 | 5/2018 |
| EP | 3285399 | 7/2018 |
| EP | 3741657 | 2/2021 |
| WO | 01/43228 | 6/2001 |

\* cited by examiner

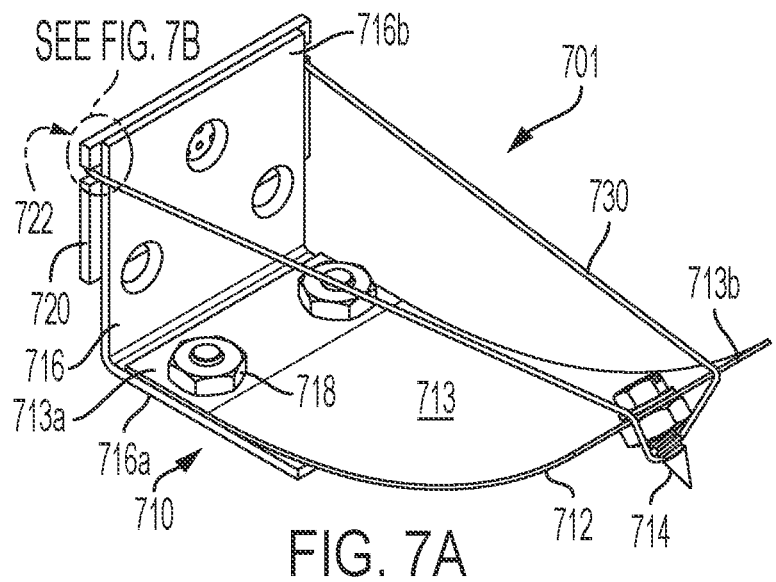
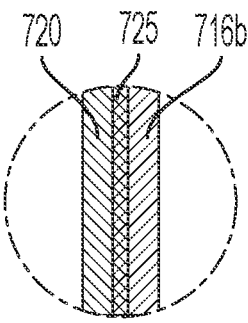
FIG. 7A
FIG. 7B
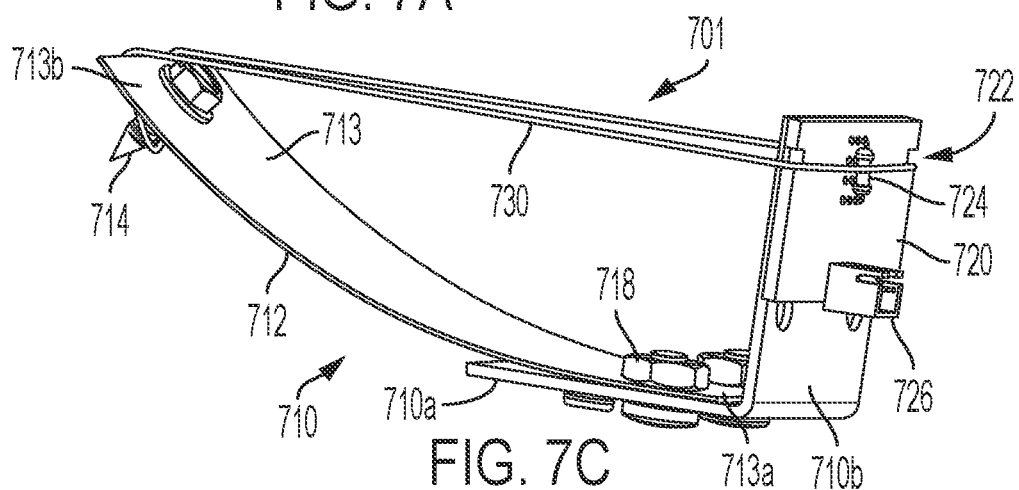
FIG. 7C
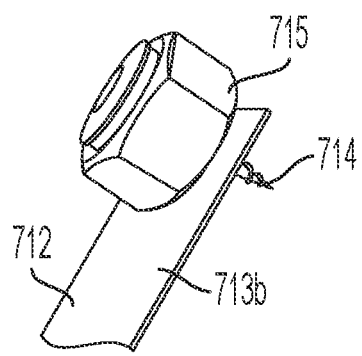
FIG. 7D

MECHANICAL TRIGGERS AND TRIGGERING METHODS FOR SELF-DESTRUCTING FRANGIBLE STRUCTURES AND SEALED VESSELS

STATEMENT REGARDING FEDERALLY SPONSORED RESEARCH AND DEVELOPMENT

This invention is based upon work supported by DARPA under Contract No. DARPA-OOT-DUST-Float-Rsrc. The Government has certain rights to this invention.

TECHNICAL FIELD

This disclosure relates generally to mechanical triggers and triggering methods for self-destructing frangible structures and sealed vessel, and to related systems.

BACKGROUND

Systems and structures capable of physically self-destructing in a controlled, triggerable manner are useful in a variety of applications, such as reducing waste, maintaining supply chain integrity, scuttling buoys, and/or recycling waste products.

BRIEF SUMMARY

Embodiments are directed to an apparatus comprising a structure comprising a predetermined breakable region and a mechanical actuator disposed at or proximate the predetermined breakable region. The mechanical actuator comprises an impact member coupled to a spring arrangement, and a restraint member operably coupled to the spring arrangement. A trigger source is operably coupled to an electrical power source. The trigger source, in response to receiving current from the electrical power source, is configured to release or break the restraint member so as to allow the spring arrangement to forcibly move the impact member into contact with, and break, the predetermined breakable region.

Embodiments are directed to an apparatus which includes a container comprising a predetermined breakable region. A mechanical actuator is disposed within the container and situated at or proximate the predetermined breakable region. The mechanical actuator comprises an impact member coupled to a spring arrangement, and a restraint member operably coupled to the spring arrangement. A heat source is operably coupled to an electrical power source and in thermal contact with the restraint member. The heat source, in response to receiving current from the electrical power source, is configured to break the restraint member so as to allow the spring arrangement to forcibly move the impact member into contact with, and break, the predetermined breakable region, thereby facilitating ingress or egress of a liquid, a gas or a solid into or out of the container.

Embodiments are directed to an apparatus comprising a container configured for floatation in a liquid. The container comprises a first predetermined breakable region at a first location of the container, and a second predetermined breakable region at a second location of the container spaced apart from the first location. A first mechanical actuator is disposed within the container and situated at or proximate the first predetermined breakable region. A second mechanical actuator is disposed within the container and situated at or proximate the second predetermined breakable region. Each of the first and second mechanical actuators comprises an impact member coupled to a spring arrangement, a restraint member operably coupled to the spring arrangement, and a trigger source configured to be, or move into, contact with the restraint member. An electrical power source arrangement is operatively coupled to the trigger source of each of the first and second mechanical actuators. The trigger source of each of the first and second mechanical actuators, in response to receiving current from the electrical power source arrangement, is configured to release or break the restraint member so as to allow the spring arrangement to forcibly move the impact member into contact with, and break, the respective first and second predetermined breakable regions, thereby facilitating venting of air from the container via one of the broken first and second predetermined breakable regions and ingress of the liquid into the container via the other of the broken first and second predetermined breakable regions.

BRIEF DESCRIPTION OF DRAWINGS

Throughout the specification reference is made to the appended drawings wherein:

FIGS. 7A-7D illustrate a mechanical actuator assembly in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 1:
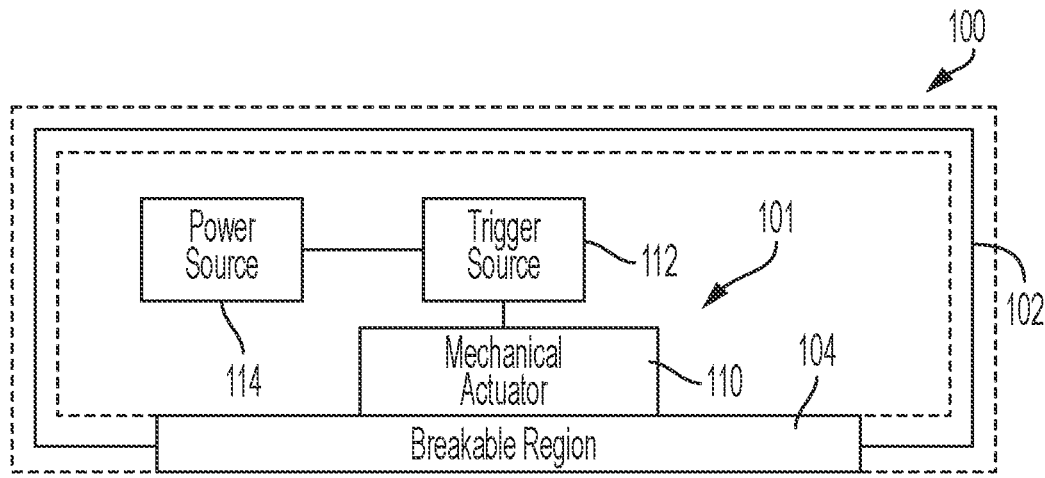
FIG. 1 shows an apparatus comprising a structure which includes a predetermined breakable region in accordance with various embodiments.

Embodiments disclosed herein relate to approaches for fracturing structures into smaller pieces in a controlled, triggerable manner. Frangible glass structures, especially when tempered; e.g., by chemical ion-exchange or by thermal quenching, are structurally very strong and become increasingly difficult to fracture with increasing thickness. Many applications require the robustness or stiffness of thicker glass, for example. As discussed below, devices capable of reliably and controllably fracturing frangible structures, in particular thick frangible structures, include mechanical devices actuatable by a trigger source operably coupled to an electrical power source. The mechanical actuator assemblies disclosed herein can be physically small and lightweight, yet provide mechanical and operational robustness that avoids unintentional triggering.

Many sealed systems, such as sensor buoys and air vessels, require controlled scuttling, so they sink and fall out of their normal operating environment after their useful life. Many of these systems utilize wall structures made of hard shells, such as metal, glass, wood, cardboard or plastic, that need to be breached to allow water or air to flow in or out of their enclosed chamber to sink the buoy or vessel. A key challenge is to provide a mechanism to scuttle such vessels in a simple, low cost, safe, and reliable way.

Embodiments of the disclosure are directed to a mechanical actuator assembly configured to damage or destroy a frangible structure or a frangible region of a rigid structure. The mechanical actuator assembly can be configured to damage or destroy a frangible container or a frangible portion of the container configured for flotation. The mechanical actuator assembly can also be configured to damage or destroy a stand-alone frangible structure not configured for flotation. When activated by a trigger source operably coupled to an electrical power source, the mechanical actuator assembly forcibly moves an impact member into contact with a frangible portion of the structure, causing the frangible portion to break, fracture or shatter. For example, a buoy or other floatable vessel can include a tempered glass window to which a mechanical actuator assembly is mounted. When activated, the mechanical actuator assembly breaks the tempered glass window into small pieces because of the built-in stress induced by tempering. The small glass residues produce an unobstructed opening in the wall of the buoy or vessel that enables rapid sinking of the buoy or vessel.

In various embodiments, the mechanical actuator assembly can be configured to fracture a frangible structure (e.g., a sheet of frangible material) which is more than about 0.5 mm thick. For example, the thickness of the frangible structure may range from about 0.5 mm to about 2 mm (e.g., about 0.5 mm, about 1 mm, about 2 mm) or even greater than 2 mm. In some embodiments, the frangible portion of the structure may break into a multiplicity of small fragments, e.g., fragments that have length, width, and height dimensions of greater than about 10 mm, greater than about 900 µm, less than about 500 µm, or even less than about 100 µm.

Embodiments of the disclosure are directed to a mechanical actuator assembly configured to break a predetermined breakable region of a structure to which the mechanical actuator assembly is attached. The mechanical actuator assembly includes a spring arrangement and an impact member coupled to the spring arrangement. The mechanical actuator assembly also includes a restraint member operably coupled to the spring arrangement. A trigger source is operably coupled to an electrical power source. In some embodiments, the trigger source includes a heat source which is operably coupled to an electrical power source and is in thermal contact with the restraint member. In other embodiments, the trigger source includes an electromagnetic solenoid configured to actuate a component (e.g., a sharp object or cutting member) that breaks the restraint member. In further embodiments, the trigger source includes a electrostatic device configured to apply a voltage on a sharp electrode to create a large electric field.

The trigger source, in response to receiving current from the electrical power source, is configured to release or break the restraint member so as to allow the spring arrangement to forcibly move the impact member into contact with, and break, the predetermined breakable region. The mechanical actuator assembly can be actuated in response to an activation signal generated locally (e.g., via a timer or sensor signal) or remotely (e.g., via a remotely generated RF signal). Breaking the predetermined breakable region of the structure by the mechanical actuator assembly can facilitate ingress or egress of a liquid, a gas or a solid into and/or out of the structure.

Some embodiments are directed to a mechanical actuator assembly comprising a spring steel member anchored to a base. The spring steel member is cocked away from the base with a string that has a portion wrapped around a heating element. When the heating element is electrically activated, the string breaks and releases the spring steel member's mechanical energy, which then propels an attached sharp tip against a breakable component on the wall of a vessel, container or other structure. The breached area allows water or air to enter and/or exit the vessel, container or structure.

Other embodiments are directed to a mechanical actuator assembly comprising a torsion spring anchored to a base. The torsion spring is cocked toward the base with a string that has a portion wrapped around a heating element. When the heating element is electrically activated, the string breaks and releases the torsion spring's mechanical energy, which then propels an attached sharp tip against a breakable component on the wall of a vessel, container or other structure. The breached area allows water or air to enter and/or exit the vessel, container or structure.

FIG. 1 shows an apparatus 100 comprising a structure 102 which includes a predetermined breakable region 104 in accordance with various embodiments. The predetermined breakable region 104 defines a frangible portion or portions of the structure 102. In some implementations, the predetermined breakable region 104 defines only a portion, but not the entirety, of the structure 102. For example, the predetermined breakable region 104 can be implemented as a frangible region (e.g., a windowed region) integrated into a rigid (e.g., non-frangible) wall of the structure 102. In other implementations, the predetermined breakable region 104 defines nearly all (e.g., >90%), or the entirety, of the structure 102 (e.g., see the dashed lines extending the predetermined breakable region 104 about the structure 102). For example, the structure 102 can be implemented as a vessel or a container defined or encompassed by a frangible wall or a wall-and-cover structure (e.g., glass vessel or buoy) configured for flotation (e.g., a so-called drifter).

A mechanical actuator assembly 101 is disposed within the structure 102. In the embodiment shown in FIG. 1, the mechanical actuator assembly 101 includes a mechanical actuator 110, a trigger source 112, and a power source 114. The mechanical actuator 110 is disposed at or proximate the predetermined breakable region 104 of the structure 102 and is operably coupled to the trigger source 112. The trigger source 112 is operably coupled to the electrical power source 114 (e.g., a conventional battery or other power source as discussed below). In the case of a rechargeable battery, the structure 102 can include or support a solar cell or cell array configured to charge the rechargeable battery. In response to receiving current from the electrical power source 114, the trigger source activates the mechanical actuator 110 which forcibly contacts, and breaks, the predetermined breakable region 104.

Figure 2:
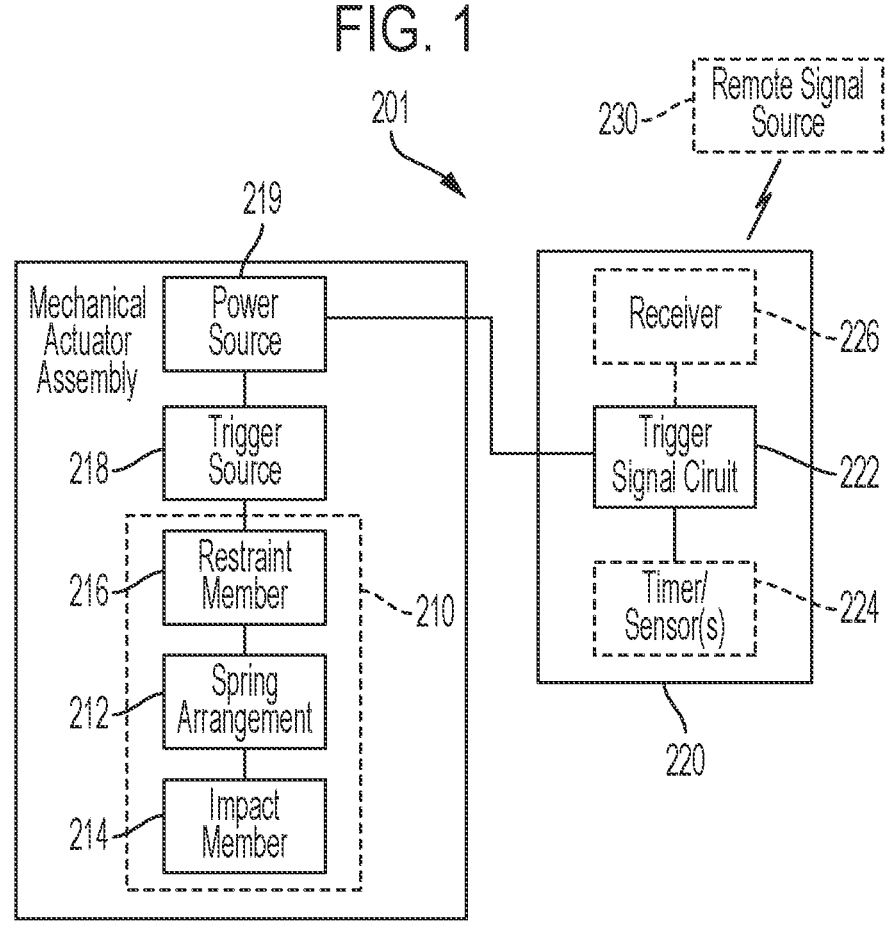
FIG. 2 shows a mechanical actuator assembly suitable for incorporation in any of the structures disclosed herein in accordance with various embodiments.

FIG. 2 shows a mechanical actuator assembly 201 suitable for incorporation in any of the structures disclosed herein in accordance with various embodiments. The mechanical actuator assembly 201 includes a mechanical actuator 210, which can be disposed at or proximate to the predetermined breakable region 104 of the structure 102 shown in FIG. 1. The mechanical actuator 210 includes a spring arrangement 212 and an impact member 214 coupled or mounted to the spring arrangement 212. A restraint member 216 is operably coupled to the spring arrangement 212. The restraint member 216 is configured to maintain the spring arrangement 212 and the impact member 214 in a pre-actuation position prior to activation of the mechanical actuator 210. The spring arrangement 212 comprises a spring element having a spring force sufficient to maintain the impact member 214 in the pre-actuation position without causing the restraint member 216 to release or break.

The mechanical actuator assembly 201 also includes a trigger source 218 operably coupled to an electrical power source 219. The trigger source 218 is configured to be in contact, or move into contact, with the restraint member 216. For example, the trigger source 218 can be a heat source (e.g., a resistor) in thermal contact (e.g., which may also include physical contact) with the restraint member 216. In another example, the trigger source 218 can be an electromagnetic solenoid or an electrostatic device configured to actuate a cutting component that releases the restraint member 216.

In response to receiving current from the electrical power source 219, the trigger source 218 releases or breaks the restraint member 216 so as to allow the spring element of the spring arrangement 212 to forcibly move the impact member 214 into contact with, and break, the predetermined breakable region 104 of the structure 102. In some embodiments, the trigger source 218 is a heat source that causes the restraint member to break. In other embodiments, the trigger source is an electromagnetic solenoid that mechanically releases the restraint member 216.

As previously discussed, the predetermined breakable region 104 can define one or more frangible portions of some or all of the structure 102. For example, the predetermined breakable region 104 can encompass less than a major portion (e.g., <50%, such as <40%, 30%, 20%, 10% or 5%), more than a major portion (e.g., >50%), nearly the entirety (e.g., >80%, such as >85%, 90%, 95% or 98%) or the entirety (100%) of the structure 102. The spring element of the spring arrangement 212 has a spring force sufficient to cause the impact member 214 to break the predetermined breakable region in response to releasing or breaking of the restraint member 216.

In accordance with various embodiments, the spring arrangement 212 can include at least one of a torsion spring and a spring steel member. It is understood that other types of spring mechanisms and objects that can be configured to produce a spring force are contemplated (e.g., a leaf spring, a cantilever spring, plastic plates). The impact member 214 includes a mechanical member configured to impart a high force or shock applied over a short time to the predetermined breakable region 104. The impact member 214, according to various embodiments, can include at least one of a metal or other rigid member with a sharpened, tapered, strengthened or hardened end (e.g., a screw, nail, pin, spike, punch, tack, peg, hammer-like member). According to various embodiments, the trigger source 218 can include at least one of an electrically resistive heater (e.g., a resistor, such as a metal foil resistor or a carbon film resistor), an electric match, an arc lighter, a plasma lighter, and a semiconductor laser. In accordance with various embodiments, the power source 219 can include at least one of a battery, a DC power supply, an AC power supply, a supercapacitor, and an electromagnetically-coupled charged source.

The mechanical actuator assembly 201 can include a trigger mechanism 220 comprising a trigger signal circuit 222 operably coupled to the power source 219. In some embodiments, the trigger mechanism 220 includes a receiver 226, such as an RF receiver (e.g., a satellite receiver) configured to receive a trigger signal generated from a remote signal source 230 (e.g., a communications satellite). The trigger signal circuit 222 can alternatively or additionally include a timer and/or one or more sensors configured to generate a trigger signal. For example, a trigger signal can be generated by the trigger signal circuit 222 in response to expiration of a predetermined duration of time (e.g., days, weeks, months, years) or in response to a sensor signal generated by one or more on-board sensors (e.g., a signal generated by an on-board GPS sensor in response to detecting a position of a floatation structure 102 outside of a predefined geo-fenced region).

In some implementations, the trigger signal circuit 222 can include a switch that can be can be remotely controlled allowing fracture of the structure 102 to be triggered from a location remote from the structure 102 (e.g., remote signal source 230). In such an embodiment, a wireless signal activates the switch to connect the power source 219 to the trigger source 218. In some implementations, the switch includes a MOSFET transistor that can be turned on or off by applying a bias voltage at the transistor's gate. In other implementations, the switch can be a silicon-controlled rectifier that can be turned on by applying a small current at one of its terminals. In further implementations, the switch can be a mechanical relay switch.

Figure 3:
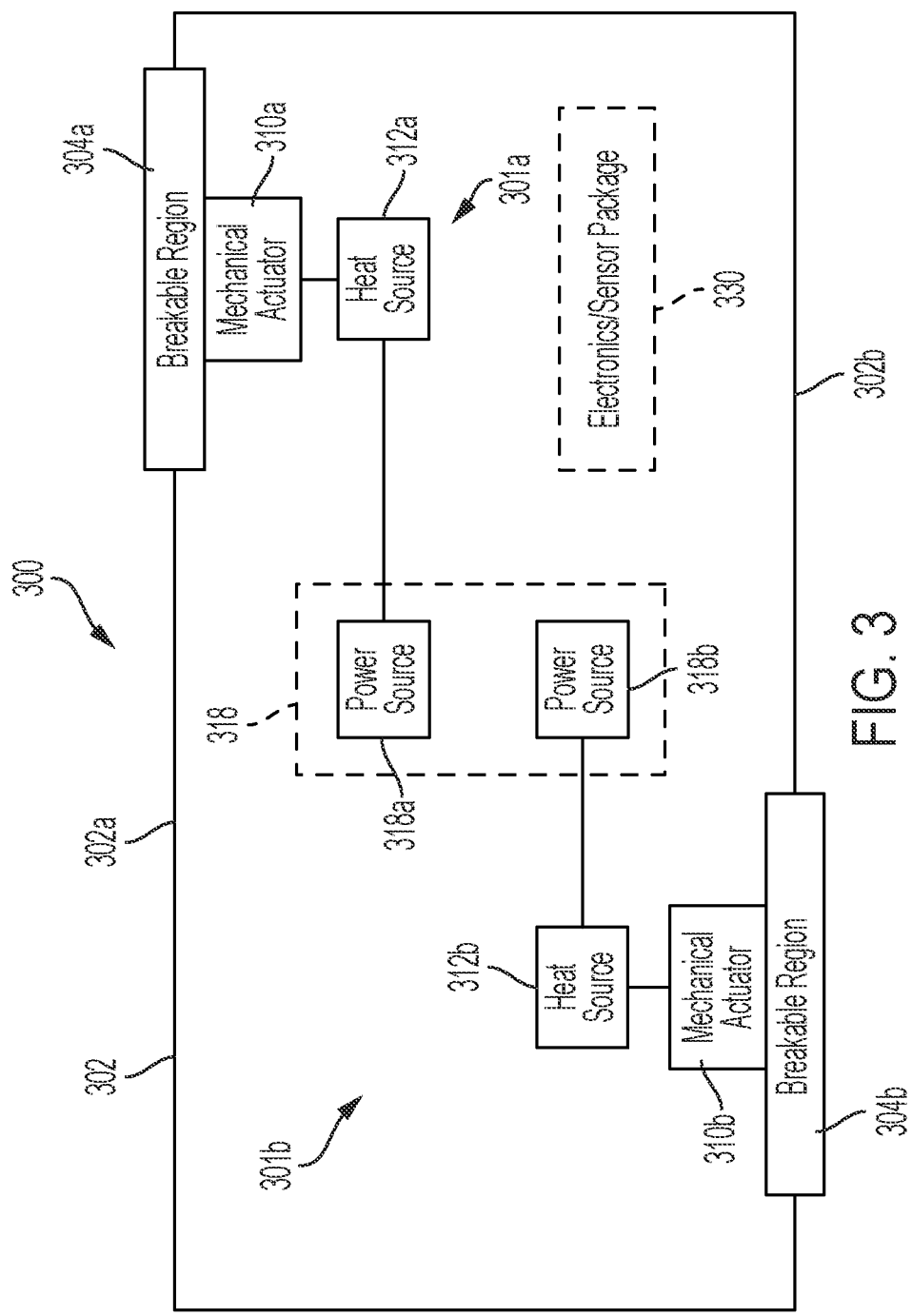
FIG. 3 shows an apparatus comprising a structure which includes a multiplicity of predetermined breakable regions and a corresponding multiplicity of mechanical actuator assemblies in accordance with various embodiments.

FIG. 3 shows an apparatus 300 comprising a structure 302 which includes a multiplicity of predetermined breakable regions and a corresponding multiplicity of mechanical actuator assemblies in accordance with various embodiments. In the representative example shown in FIG. 3, the structure 302 includes a first predetermined breakable region 304a situated on a first surface 302a of the structure 302 and a second predetermined breakable region 304b situated on a second surface 302b of the structure 302. Although shown as being disposed on opposing surfaces of the structure 302, the first and second predetermined breakable regions 304a, 304b can be disposed on the same surface or on adjacent surfaces of the structure 302. Although FIG. 3 shows two disparate predetermined breakable regions 304a, 304b and two disparate mechanical actuator assemblies 301a, 301b, it is understood that the structure 302 can include any number of predetermined breakable regions and mechanical actuator assemblies. It is also understood that two or more disparate mechanical actuator assemblies can be positioned at or proximate the same predetermined breakable region of the structure 302 (e.g., providing redundancy to increase performance robustness).

In the case of the structure 302 being configured as a vessel or container for flotation, for example, the first predetermined breakable region 304a can be situated above a predefined waterline of the floatable structure 302, and the second predetermined breakable region 304b can be situated below the predefined waterline of the floatable structure 302. In such implementations, breaking of the first predetermined breakable region 304a provides for venting of air while breaking of the second predetermined breakable region 304b provides for ingress of water or other liquid into the structure 302, causing the structure 302 sink.

In the embodiment shown in FIG. 3, the first and second mechanical actuator assemblies 301a, 301b are disposed within the structure 302. The first mechanical actuator assembly 301a includes a mechanical actuator 310a, a trigger source 312a, and a power source 318a. The second mechanical actuator assembly 301b includes a mechanical actuator 310b, a trigger source 312b, and a power source 318b. In some embodiments, the power sources 318a, 318b of the first and second mechanical actuator assemblies 301a, 301b are independent power sources (e.g., disparate batteries). In other embodiments, the power sources 318a, 318b of the first and second mechanical actuator assemblies 301a, 301b are implemented as a common (e.g., single) electrical power source arrangement 318. In the case of a common or single power source, the trigger sources 312a and 312b can be connected in parallel. The leads of the trigger sources 312a and 312b can be crimped together into a single header to facilitate simultaneous activation, or the electrical distribution can be implemented at the circuit board level (see PCB 720, 720a in FIGS. 7A-7G) with separate headers for each source. Alternatively, the trigger sources 312a and 312b can be connected in series, where a common current (instead of voltage) activates each trigger source 312a, 312b. The first and second mechanical actuator assemblies 301a, 301b are preferably configured, and function, in the manner described with respect to FIGS. 1 and 2.

The structure 302 can also include an electronics/sensor package 330 which can operate independent of the first and second mechanical actuator assemblies 301a, 301b. The electronic/sensor package 330 can include a wide variety of electronic devices and/or sensors. For example, the electronic/sensor package 330 can include one or more of a sea surface temperature sensor (SST), a high resolution sea surface temperature sensor (HRSST), a barometric pressure sensor, a drogue presence sensor, a probe sensor, a conductivity/temperature datalogger, a GPS sensor, a wireless RF transmitter or transceiver, a satellite communication transmitter or transceiver (e.g., an IRIDIUM satellite communication device to transmit sensor and other data), salinity sensor, fluorescence sensor, dissolved oxygen sensor, pCO2 sensor, and a low radar echo sensor to reduce the risk of collision or interference with surface crafts.

Figure 4A:
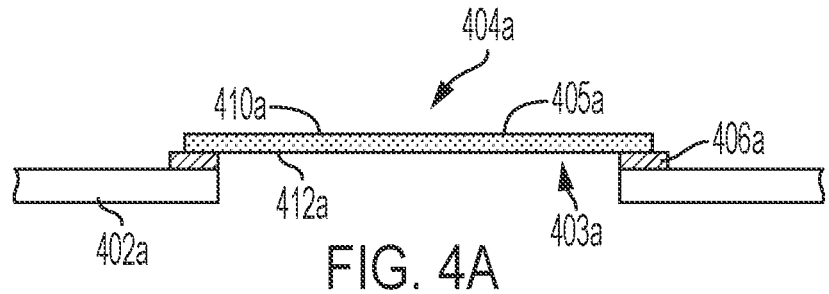
FIGS. 4A-4E show different configurations of a predetermined breakable region of a structure described herein in accordance with various embodiments.

FIG. 4A-4E show different configurations of a predetermined breakable region of a structure described herein in accordance with various embodiments. FIG. 4A shows a portion of a structure 402a which includes a predetermined breakable region 404a comprising a void 403a in the structure 402a (e.g., a window or cutout in a rigid wall of the structure). A sheet of frangible material 405a is disposed over, and extends across, the void 403a. The sheet of frangible material 405a includes a first surface 412a and an opposing second surface 410a. The sheet of frangible material 405a is held in place over the void 403a by sealing tape 406a disposed between a periphery of the first surface 412a of the sheet of frangible material 405a and a periphery of the structure 402a defining the region of the void 403a.

Figure 4B:
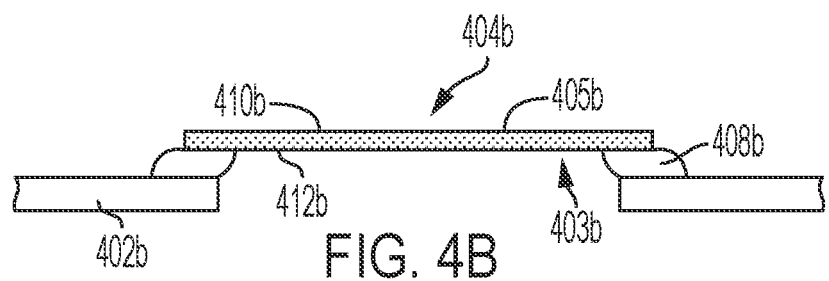

FIG. 4B shows a portion of a structure 402b which includes a predetermined breakable region 404b comprising a void 403b in the structure 402b. A sheet of frangible material 405b is disposed over, and extends across, the void 403b. The sheet of frangible material 405b includes a first surface 412b and an opposing second surface 410b. The sheet of frangible material 405b is held in place over the void 403b by sealing adhesive 408b disposed between a periphery of the first surface 412b of the sheet of frangible material 405b and a periphery of the structure 402b defining the region of the void 403b.

Figure 4C:
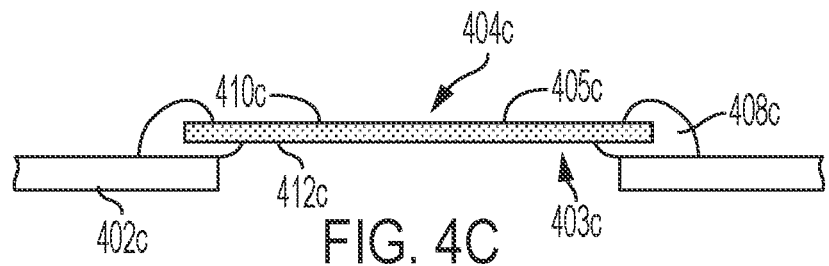

FIG. 4C shows a portion of a structure 402c which includes a predetermined breakable region 404c comprising a void 403c in the structure 402c. A sheet of frangible material 405c is disposed over, and extends across, the void 403c. The sheet of frangible material 405c includes a first surface 412c and an opposing second surface 410c. The sheet of frangible material 405c is held in place over the void 403c by sealing adhesive 408c disposed between a periphery of the first surface 412c of the sheet of frangible material 405c and a periphery of the structure 402c defining the region of the void 403c. In the embodiment shown in FIG. 4C, the sealing adhesive 408c is also disposed along a peripheral edge of the sheet of frangible material 405c and along a periphery of the second surface 410c of the sheet of frangible material 405c adjacent the region of the void 403c.

Figure 4D:
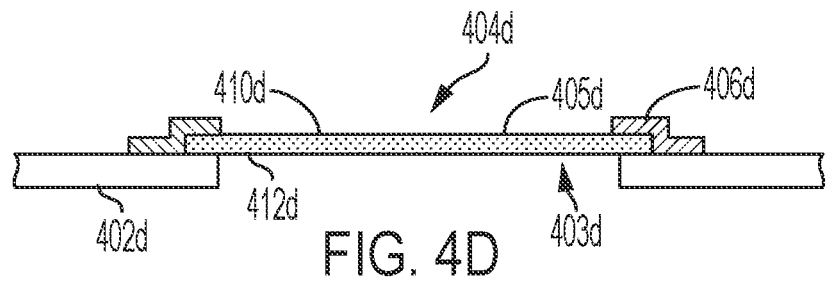

FIG. 4D shows a portion of a structure 402d which includes a predetermined breakable region 404d comprising a void 403d in the structure 402d. A sheet of frangible material 405d is disposed over, and extends across, the void 403d. The sheet of frangible material 405d includes a first surface 412d and an opposing second surface 410d. The sheet of frangible material 405d is held in place over the void 403d by sealing tape 406d disposed along the periphery of the second surface 410d of the sheet of frangible material 405d adjacent the region of the void 403d, along a peripheral edge of the sheet of frangible material 405d, and along a periphery of the structure 402d adjacent the region of the void 403d.

Figure 4E:
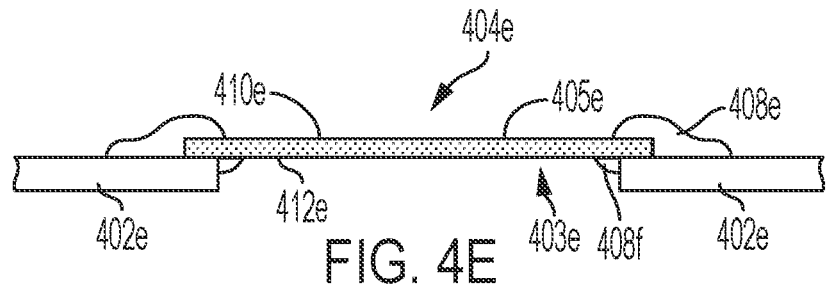

FIG. 4E shows a portion of a structure 402e which includes a predetermined breakable region 404e comprising a void 403e in the structure 402e. A sheet of frangible material 405e is disposed over, and extends across, the void 403e. The sheet of frangible material 405e includes a first surface 412e and an opposing second surface 410e. The sheet of frangible material 405e is held in place over the void 403e by a sealant adhesive 408e disposed along the periphery of the second surface 410e of the sheet of frangible material 405e adjacent the region of the void 403e, along a peripheral edge of the sheet of frangible material 405e, and along a periphery of the structure 402e adjacent the region of the void 403e. A bead of sealant adhesive 408f can be disposed along the joint formed between the first surface 412e of the sheet of frangible material 405e and the interior peripheral edge of the structure 402e adjacent the void 403e.

Various types of conventional and/or waterproof sealing tape and/or sealant adhesives can be used in accordance with any embodiments disclosed herein. Suitable sealing tape and/or sealant adhesives include those containing polyurethane, silicone, MSP (modified silane polymer) and/or butyl rubber chemistries. Suitable sealing tape, for example, includes those that contain a highly concentrated rubber-based adhesive. Suitable sealing tape includes those commercially available under the following name brands: Gorilla®, T-Rex®, SolutioNerd®, Tape Ninja®, X-Treme Tape®, and Scotch®. Suitable sealing adhesives (e.g., flowable or sprayable sealants) include those containing liquid rubber (synthetic or natural) and/or any of the chemistries listed above. Suitable sealing adhesives include those commercially available under the following name brands: 3M™ building or marine adhesive sealant (e.g., Marine Adhesive Sealant 5200), Liquid Nails®, Flex Seal®, DAP®, LR® (Liquid Rubber), and LOCTITE®.

In various implementations, at least the sheet of frangible material 405a-405e (and, in some implementations, both the sheet of frangible material 405a-405e and the structure 402a-402e) can be made of a brittle or frangible material such as glass (e.g., standard or tempered), ceramic, plastic, laminated fillers of wood, metal or gypsum, clay, porcelain, and/or metal. A glass sheet of frangible material 405a-405e and/or structure 402a-402e can comprise one or more of cast glass, slumped glass, untempered glass, tempered glass, thermally tempered glass, ion-exchanged glass, soda-lime glass, lead glass, borosilicate glass, aluminosilicate glass, alkali-aluminosilicate glass, silica glass, and sodium-rich glass. Although the structure 402a-402e may be complex and include many different materials and shapes, the frangible material can be disposed at one or more predetermined breakable regions 404a-404e each comprising a void 403a-403e in the structure 402a-402e.

Figure 5:
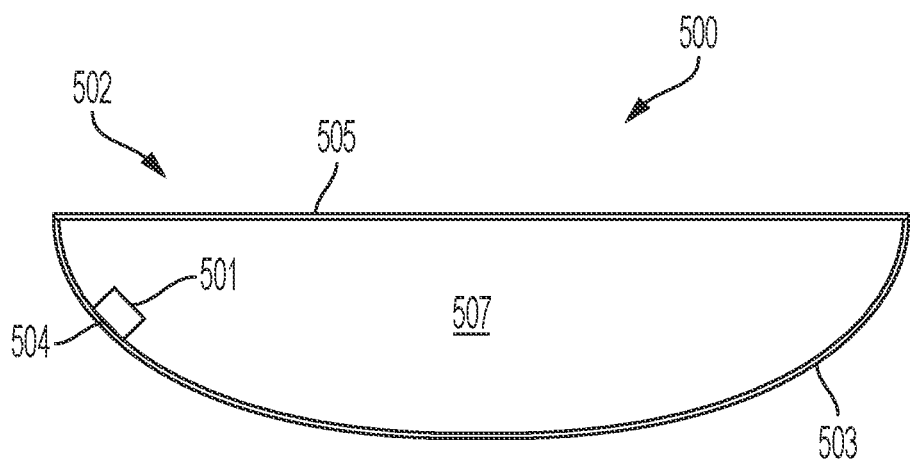
FIG. 5 shows an apparatus comprising a structure which includes a predetermined breakable region and a mechanical actuator assembly disposed at or proximate the predetermined breakable region in accordance with various embodiments.

FIG. 5 shows an apparatus 500 comprising a structure 502 which includes a predetermined breakable region 504 and a mechanical actuator assembly 501 disposed at or proximate the predetermined breakable region 504 in accordance with various embodiments. The representative structure 502 shown in FIG. 5 is configured as a container or a vessel. The structure 502 includes a vessel wall 503 and a cover plate 505. A void 507 is defined within a space between the vessel wall 503 and the cover plate 505. According to various embodiments, a liquid, a gas or a solid can be disposed in the void 507 of the structure 502. A mechanical connection or coupling between the cover plate 505 and the vessel wall 503 includes a sealing member or material, such as one or a combination of sealing tape and sealing adhesives described previously. The mechanical connection or coupling between the cover plate 505 and the vessel wall 503 is preferably a waterproof connection or coupling. The structure 502 can also include an electronics/sensor package, such as the electronics/sensor package 330 shown in FIG. 3.

The mechanical actuator assembly 501 is disposed within the void 507 of the structure 502 and mounted to, or supported by, the vessel wall 503 at or in proximate the predetermined breakable region 504. As previously discussed, the predetermined breakable region 504 can define a portion, but not the entirety, of the vessel wall 503 at or proximate the location of the mechanical actuator assembly 501 according to some embodiments. For example, the vessel wall 503 can be formed from a rigid material, such as metal (e.g., stainless steel), plastic glass, wood, or a laminate or composite material. The predetermined breakable region 504 can include a sheet of frangible material according to any of the embodiments previously discussed. In other embodiments, the predetermined breakable region 504 can define a majority (e.g., >50%) or the entirety of the vessel wall 503. In further embodiments, the predetermined breakable region 504 can define a majority or the entirety of the vessel wall 503 and, in addition, all or a portion of the cover plate 505. Although shown positioned along a side region of the vessel wall 503, the mechanical actuator assembly 501 can be positioned at any location of the vessel wall 503 (e.g., near or at the bottom of the vessel wall 503). As previously discussed, the mechanical actuator assembly 501, when activated, is configured to forcibly move an impact member via a spring arrangement into contact with, and break, the predetermined breakable region 504, thereby facilitating ingress and/or egress of a liquid, a gas or a solid into or out of the structure 502.

Figure 6:
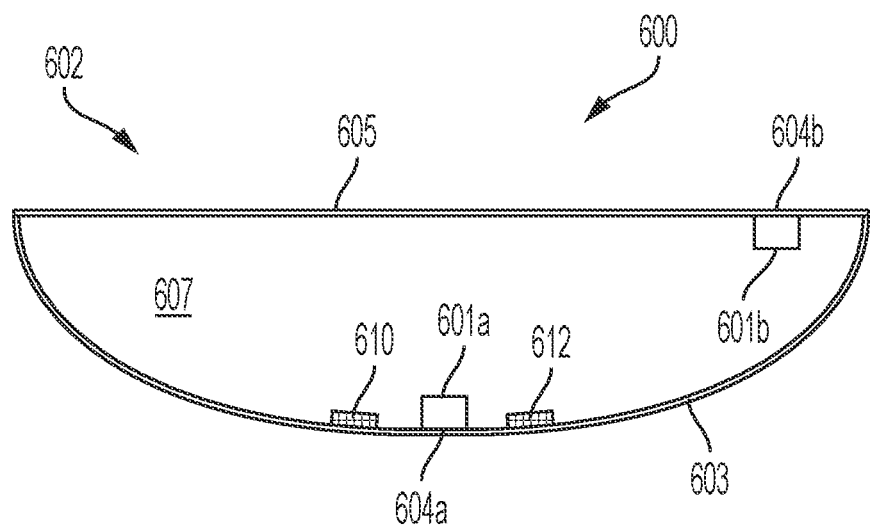
FIG. 6 shows an apparatus comprising a structure which includes first and second predetermined breakable regions and associated first and second mechanical actuator assemblies disposed at or proximate their respective predetermined breakable regions in accordance with various embodiments.

FIG. 6 shows an apparatus 600 comprising a structure 602 which includes first and second predetermined breakable regions 604a, 604b and associated first and second mechanical actuator assemblies 601a, 601b disposed at or proximate their respective predetermined breakable regions 604a, 604b in accordance with various embodiments. The representative structure 602 shown in FIG. 6 is configured as an apparatus, container or vessel configured for flotation. The structure 602 includes a vessel wall 603 and a cover plate 605. A void 607 is defined within a space between the vessel wall 603 and the cover plate 605. The structure 602 can, for example, be configured as a buoy or a drifter of a type previously described. In some embodiments, the vessel wall 603 of buoy 602 is made of a stainless steel body capped by a flat cover plate 605. The cover plate 605 can be formed from metal, such as stainless steel, or plastic, for example. The structure 602 can also include an electronics/sensor package, such as the electronics/sensor package 330 shown in FIG. 3.

The structure 602 includes one or more holes or apertures at or near the bottom of the structure 602 covered by frangible material to define a first predetermined breakable region 604a of the vessel wall 603 as previously described. It is understood that the first predetermined breakable region 604a can be positioned at any location of the vessel wall 603 below a predetermined waterline of the structure 602. A first mechanical actuator assembly 601a is disposed at or near the first predetermined breakable region 604a. The cover plate 605 includes one or more holes or apertures covered by frangible material to define a second predetermined breakable region 604b of the cover plate 605 as previously described. The second predetermined breakable region 604b can be positioned at any location of the cover plate 605, and is shown positioned at a peripheral location of the cover plate 605 in FIG. 6 as a representative location. It is understood that the second predetermined breakable region 604a can be positioned at any location of the cover plate 605 or the vessel wall 603 above the predetermined waterline of the structure 602. A second mechanical actuator assembly 601b is disposed at or near the second predetermined breakable region 604b. Ballast 610, 612 can be mounted to the vessel wall 603 at or near the bottom of the vessel wall 603. Ballast 610, 612 is preferably positioned on the vessel wall 603 below the predetermined waterline of the structure 602 and arranged to distribute weight within the structure 602.

As previously discussed, the mechanical actuator assemblies 601a, 601b, when activated, are each configured to forcibly move an impact member via a spring arrangement into contact with, and break, their respective predetermined breakable region 604a, 604b. Breaking of the first predetermined breakable region 604a by the first mechanical actuator assembly 601a facilitates venting of air from the cover plate 605 of the structure 602, while breaking of the second predetermined breakable region 604b by the second mechanical actuator assembly 601b facilitates ingress of liquid (e.g., sea or lake water) into the void 607 of the structure 602, causing scuttling of the structure 602.

According to various embodiments, particularly those in which the structure 602 is exposed to ocean or lake water, all or a portion of the exterior surface of the structure 602 can be coated with an anti-biofouling chemical. For example, the coating of anti-biofouling chemical can have a thickness of about 1.5 to about 150 μm. A suitable anti-biofouling coating material is Silicone Slip Anti-Fouling Coating (Product #SS-567) available from Silicone Solutions in Cuyahoga Falls, Ohio).

EXAMPLE

An experiment was conducted using a structure 602 of the type described with reference to FIG. 6 in order to verify the efficacy of scuttling buoys despite the presence of trapped air bubbles. In the experiment, the first predetermined breakable region 604a included an opening with a diameter of 0.5 inches and the second predetermined breakable region 604b included an opening with a diameter of 0.25 inches. After activation of the first and second mechanical actuator assemblies 601a, 601b, the chamber 607 of the structure 602 quickly filled with water which resulted in the structure 602 tipping over in about 28 seconds and ultimately sinking within about 30 seconds from the initial water ingress.

FIGS. 7A-7D illustrate a mechanical actuator assembly 701 in accordance with various embodiments. The mechanical actuator assembly 701 can be incorporated in any of the structures disclosed herein. The mechanical actuator assembly 701 includes a mechanical actuator 710 comprising a frame 716 and a spring arrangement 712 mechanically connected or coupled to the frame 716. In the embodiment shown in FIGS. 7A-7D, the frame 716 is an L-shaped metal bracket and the spring arrangement 712 includes a spring element in the form of an elongated spring steel member 713. A first end 713a of the spring steel member 713 is connected to a base 716a of the frame 716, such as by way of one or more nuts and bolts or, alternatively, one or more rivets or welds.

An impact member 714 is connected or coupled to the spring steel member 713 at a second end 713b of the spring steel member 713. The impact member 714 is depicted as a screw having a pointed tip passing through a hole in the spring steel member 713 and affixed at the second end 713b of the spring steel member 713 via a nut. It is understood that the impact member 714 can be implemented using any of previously described mechanical members configured to impart a high force or shock applied over a short time to a predetermined breakable region of a structure. In some embodiments, the spring steel member 713 can include a mass load 715 (e.g., a metal weight such as a large bolt and/or number of washers) connected to or situated proximate the impact member 714. The mass load 715 serves to increase the impact force imparted by the impact member 714.

The mechanical actuator 710 also includes a restraint member 730 operably coupled to the spring arrangement 712 and a backplate 716b extending at an angle (e.g., about 90 degrees) from the base 716a of the frame 716. As shown, the restraint member 730 maintains the spring steel member 713 in a cocked state via a tensile force maintained between the backplate 716b and the second end 713b of the spring steel member 713. The restraint member 730 is shown as a continuous loop member (e.g., a string) that extends around opposing side edges of the backplate 716b of the frame 716 and a portion of the impact member 714 (e.g., also contacting an edge surface of the second end 713b of the spring steel member 713). A printed circuit board (PCB) 720 is shown mounted to a back surface of the backplate 716b and includes side notches 722 configured to receive the restraint member 730 as it extends around the side surfaces of the backplate 716b of the frame 716. As is shown in FIG. 7B, the PCB 720 can be mounted to the back surface 710b of the backplate 716b via an adhesive 725 (e.g., dielectric adhesive tape) between the PCB 720 and the back surface 710b of the backplate 716b. It is understood that the PCB 720 can be mounted to the back surface 710b of the backplate 716b using any type of adhesive material or fastening arrangement.

The restraint member 730 is configured to maintain the second end 713b of the spring steel member 713 and the impact member 714 in a pre-actuation position without causing the restraint member 730 to release or break. More particularly, the spring steel member 713 has a spring force sufficient to maintain the impact member 714 in the pre-actuation position without causing the restraint member 730 to release or break. Additionally, the spring force of the spring steel member 713 is sufficient to cause the impact member 714 to break the predetermined breakable region of the structure in response to releasing or breaking of the restraint member 730.

The mechanical actuator assembly 701 includes a trigger source 724 operably coupled to an electrical power source (not shown) via an electrical connector 726. The electrical power source can include one or more of a battery, a DC power supply, an AC power supply, a supercapacitor, and an electro-magnetically-coupled charged source. As is best seen in FIG. 7C, the trigger source 724 and electrical connector 726 are disposed on PCB 720. According to some embodiments, the trigger source 724 comprises an electrically resistive heater such as a resistor. In other embodiments, the trigger source 724 can comprise an electric match, an arc lighter, a plasma lighter or a semiconductor laser. The restraint member 730 is in thermal contact with the trigger source 724. When activated, the heat generated by the trigger source 724 damages the restraint member 730 causing the restraint member 730 to release the spring 713 from its pre-actuation position.

In accordance with embodiments that employ a resistor as a trigger source, the resistor preferably has a relatively low resistance (e.g., about 5 Ohm to about 20 Ohm) and is operated above its specified power rating so as to intentionally cause it to overheat (e.g., melt). The resistor, when intentionally driven above its power rating, generates heat sufficient to burn through or melt the restraint member 730.

According to embodiments of a trigger source 724 that employs a resistor, a carbon film resistor or a metal foil resistor having a resistance of about 5 Ohm to about 25 Ohm and a power rating of about ⅛ Watt to about ¼ Watt can be used. The electrical power source coupled to the resistor via electrical connector 726 can be a conventional (e.g., a 9V alkaline or lithium-ion) battery, although a custom-made battery can be used. For example, the electrical power source can include a 9V alkaline battery, a 18650 battery or a CR123A battery. By way of further example, the electrical power source can include an alkaline battery configured to supply a peak current of between about 0.6 A to about 3.5 A. The resistor preferably has a resistance ranging from about one-eighth of an internal impedance of the electrical power source to about $V^2/P$, where V is a voltage of the electrical power source and P is a minimum electrical power needed to break the restraint member 730. In various embodiments employing common 9V alkaline batteries as the power source, the resistor can have a resistance ranging from about 5 Ohm to about 20 Ohm (e.g., ~10 Ohm) for good impedance matching. Other choices or resistor values could be more suitable for different types of power supplies or for different power delivery configurations.

As discussed previously, the mechanical actuator assembly 701 can be configured as a compact device. According to some embodiments, the base 716a of the L-bracket frame 716 can have a length and a width of about 1.5", and the backplate 716b of the L-bracket frame 716 can have a length of about 1.6" and a width of about 1.5". The spring steel member 713, in a relaxed (un-cocked) state, can have a length of about 3.75" and a width of about 1.5". A hole having a diameter of about 0.177" (to accommodate the impact member 714, e.g., a #10×½" piercing sheet metal screw) can be provided about 0.25" from the second end 713b of the spring steel member 713 and centered between opposing sides of the spring steel member 713. The spring steel member 713 can be rectangular in shape and formed using 1095 spring steel (e.g., 0.032", hardness RC50). The PCB 720 can have a width of about 1.7" and a height of about 0.9". The notches 722 can have a cut-in depth and a height of about 0.10", respectively. The resistor 724 can be a 10 Ohm metal film ¼ Watt resistor or a 10 Ohm carbon film ⅛ watt resistor. The restraint member 730 can be a braided nylon string (e.g., 131 lb available from T. W. Evans Cordage as item 12-500 No-1). The electrical power connector 726 can be an XH2 header.

Figure 7E:
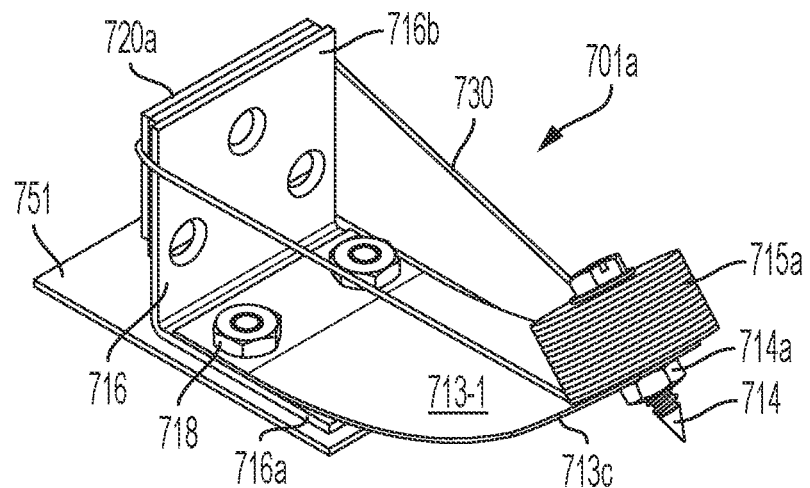
FIGS. 7E-7G illustrate a mechanical actuator assembly in accordance with various embodiments.
Figure 7F:
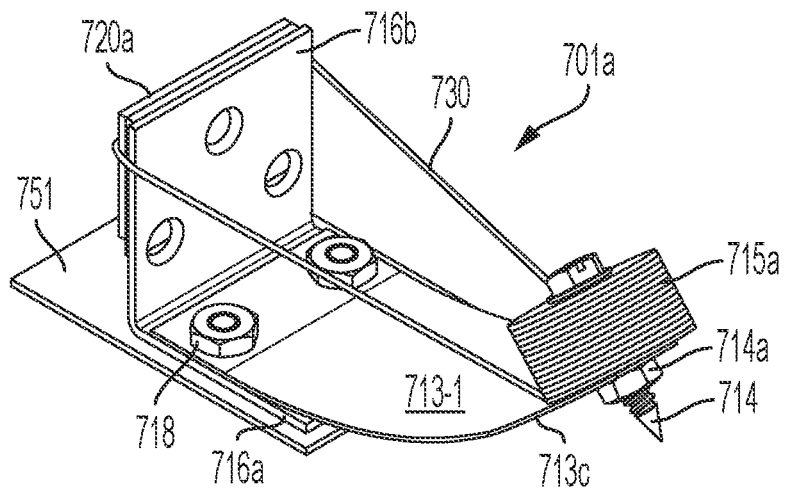
Figure 7G:
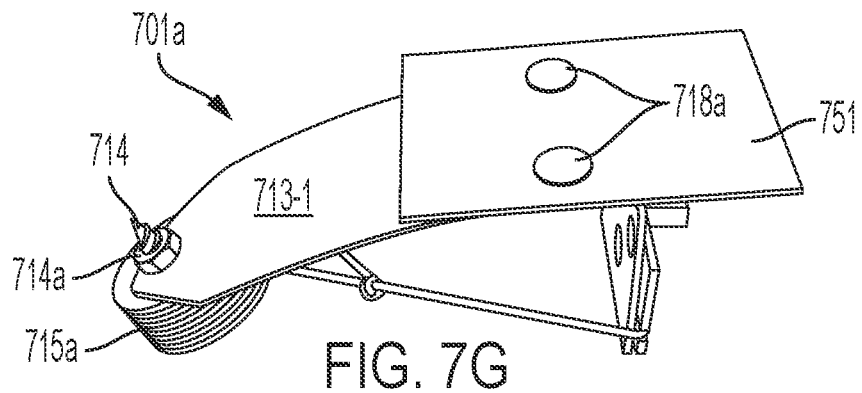

FIGS. 7E-7G illustrate a mechanical actuator assembly 701a in accordance with various embodiments. The mechanical actuator assembly 701a is structurally and functionally similar to the mechanical actuator assembly 701 shown in FIGS. 7A-7D. As such, many of the features which are common to the two mechanical actuator assemblies 701, 701a are not shown in FIGS. 7E-7G for purposes of clarity. In the embodiment shown in FIGS. 7E-7G, the elongated spring steel member 713a has a tapered second end 713c to which the impact member 714 is attached. The tapered shape of the second end 713c provides for a more compact design for a wide variety of structures (e.g., containers and vessels), particularly structures with curved walls. The mass load 715a, also attached at the second end 713c, comprises a stack of metal washers with central voids. The impact member 714 (e.g., a piercing sheet-metal screw) passes through the central voids of the mass load 715a and a hole provided near the distal tip of the second end 713c. The impact member 714 and mass load 715a are secured at the second end 713c by a nut 714a.

In the embodiment shown in FIGS. 7E-7G, the PCB 720a is mounted to the back surface of the backplate 716b. In this embodiment, the PCB 720a does not include notches 722 (see FIGS. 7A-7C) and has a width which is either coextensive with or smaller than that of the backplate 716b. As shown, the restraint member 730 (e.g., string) extends around the backplate 716b and the PCB 720a. The restraint member 730 also extends under or around the mass load 715a (shown as a stack of washers) and the head-side of the impact member 714. In this configuration, the restraint member 730 does not extend over the distal edge of the second and 713c, as is the case in the embodiment shown in FIGS. 7A-7C. The tie-down arrangement of the restraint member 730 shown in FIGS. 7A-7C eliminates risk of premature breakage of the restraint member 730 during operation.

Figure 7H:
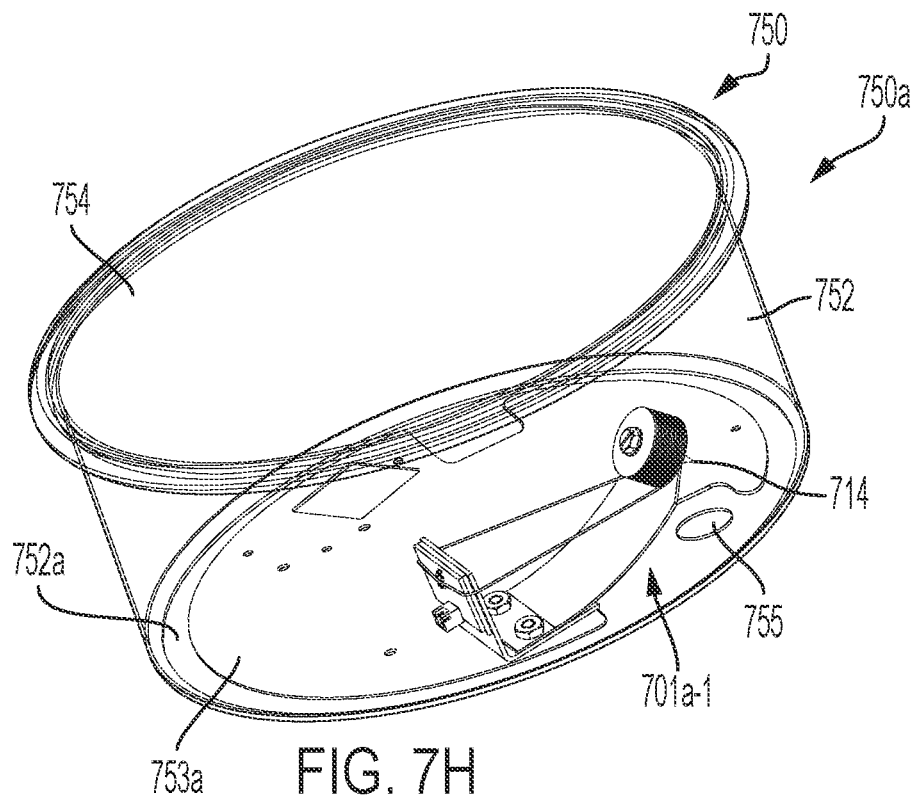
FIGS. 7H and 7I show an apparatus in the form a container or vessel that incorporates one, two or more mechanical actuator assemblies in accordance with various embodiments.

As is also shown in the embodiment of FIGS. 7E-7G, and as best seen in FIG. 7G, the base 716a of the frame 716 is mounted to a plate 751 using fasteners 718a having a flat engagement surface that facilitates near-flush mounting (e.g., <0.030" screw head) of the mechanical actuator assembly 701a to the plate 751. The fasteners 718a can be flush-head studs or pins (e.g., PEM® Fasteners available from PennEngineering®). Flush mounting the mechanical actuator assembly 701a to the plate 751 advantageously prevents or significantly reduces tilting of the mechanical actuator assembly 701a when mounted to the plate 751 (e.g., a 1 mm thick base plate), and allows for use of a single layer of adhesive (e.g., 3M® VHP double-cited adhesive tape) to mount the plate 751 to a vessel structure (e.g., a vessel base surface as shown in FIG. 7H). The embodiment shown in FIGS. 7E-7G provides for ease of manufacture by simplifying the process of placing the spring steel member 713a in its cocked (pre-actuation) state.

Figure 7I:
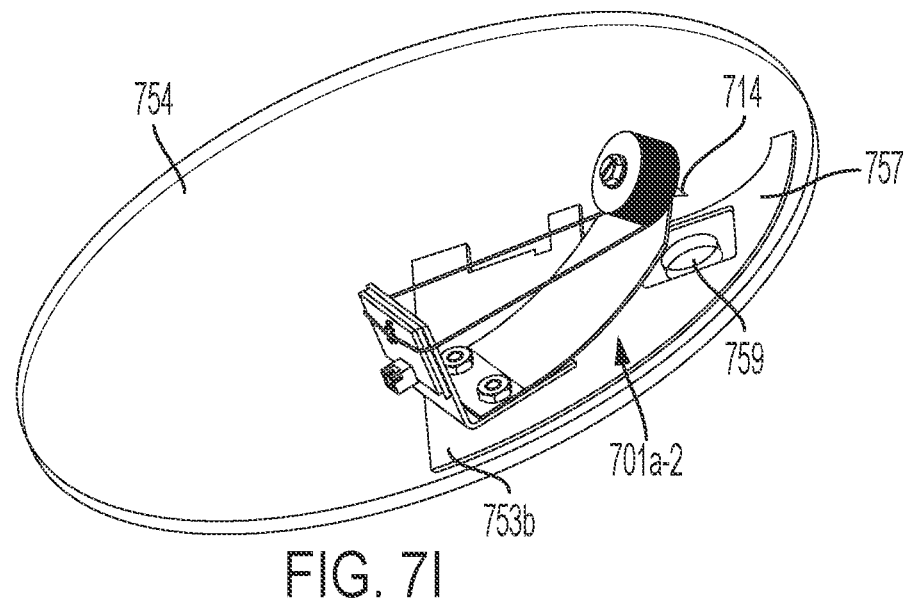

FIGS. 7H and 7I illustrate an apparatus 750 comprising a two-part structure 750a which together form a container or vessel of a type previously described. The structure 750a includes a vessel 752 and a cover plate 754. For purposes of illustration, the structure 750a is shown as being transparent or semi-transparent. It is understood that the structure 750a can be constructed from any structural material including, for example, metal, plastic, tempered glass, ceramic, or any combination of these and other materials.

The vessel 752 shown in FIG. 7H includes a plate 753a attached to a base surface 752a of the vessel 752. The plate 753a supports at least one mechanical actuator assembly 701a-1 of a type previously described (e.g., shown as the embodiment illustrated in FIGS. 7E-7G for purposes of illustration). The plate 753a can be attached to the base surface 752a of the vessel 752 using an adhesive (e.g., 3M® VHP double-cited adhesive tape) or other attachment arrangement. The mechanical actuator assembly 701a-1 and plate 753a are positioned on the base surface 752a such that the impact member 714 of the mechanical actuator assembly 701a-1 is positioned relative to a predetermined breakable region 755 of the base surface 752a. In the embodiment shown in FIG. 7H, the predetermined breakable region 75 includes an ion-exchanged glass window positioned over a void in the base surface 752a and mounted to the base surface 752a via a sealing arrangement (e.g., a 3M® RP25 VHB seal), such as any of those discussed herein.

FIG. 7I shows the cover plate 754 of the two-part structure 750a illustrated in FIG. 7H in accordance with various embodiments. In this embodiment, the cover plate 754 includes a mechanical actuator assembly 701a-2 of a type previously described affixed to a plate 753b. For purposes of illustration, the cover plate 754 is shown upside down relative to its installed configuration to provide ease of illustration of the mechanical actuator assembly 701a-2. The plate 753b can be attached to the cover plate 754 in the same manner as described above with reference to FIG. 7H and other figures. The mechanical actuator assembly 701a-2 and plate 753b are positioned on the cover plate 754 such that the impact member 714 of the mechanical actuator assembly 701a-2 is positioned relative to a predetermined breakable region 759 of the cover plate 754. In the embodiment shown in the FIG. 7I, the predetermined breakable region 759 includes an ion-exchanged glass window positioned over a void in the cover plate 754 and mounted to the cover plate 754 via a sealing arrangement (e.g., a 3M® RP25 VHB seal), such as any of those discussed herein.

Figure 8:
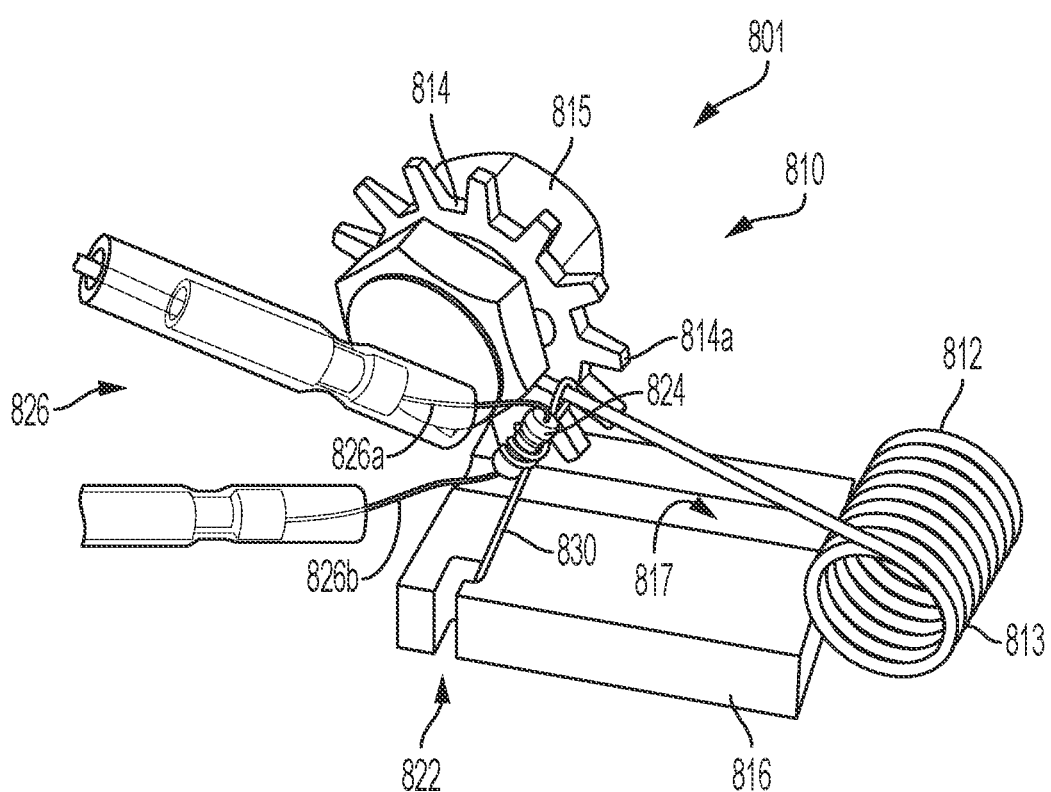
FIG. 8 illustrates a mechanical actuator assembly in accordance with various embodiments.

FIG. 8 illustrates a mechanical actuator assembly 801 in accordance with various embodiments. The mechanical actuator assembly 801 can be incorporated in any of the structures disclosed herein. The mechanical actuator assembly 801 includes a mechanical actuator 810 comprising a base 816 and a spring arrangement 812 mechanically connected or coupled to the base 816. In the embodiment shown in FIG. 8, the spring arrangement 812 includes a torsion spring 813. The base 816 incorporates a cut groove 817 to anchor a first leg (hidden from view) of the torsion spring 813. The first leg of the torsion spring 813 is pressed-fit into the groove 817. An optional adhesive can be included to strengthen the attachment. The groove 817 also functions to position the torsion spring 813 precisely relative to a tie-down location on the base 816. The tie-down location includes a notch 822 on the base 816 base that accommodates a restraint member 830 (e.g., a string).

The mechanical actuator 810 includes an impact member 814 coupled to the torsion spring 813. A load mass 815 (e.g., a nut and bolt) can be attached to the tip of a second end of the torsion spring 813 to store mechanical energy. The nut and bolt arrangement holds the impact member 814 securely in place, which is shown as a lock washer with protruding serrated teeth 814a. The torsion spring 813 and the load mass 815 are cocked backward with the restraining member 830 (e.g., string) which is looped around a trigger source 824 in the form of a resistor. The resistor 824 is designed to function as a heater, so it heats to a high temperature and breaks the restraint member 830 when activated by electrical current from a power source (e.g., a battery, not shown) electrically coupled to electrical leads 826a, 826b. When the mechanical actuator 810 is activated electrically, one or more serrated teeth 814a of the lock washer 814 hit the predetermined breakable region of a structure with an impact pressure that breaks a sheet of frangible material at the predetermined breakable region (e.g., which causes breaching the vessel wall of the structure causing the structure to sink). The mechanical actuator assembly 801 can have a compact configuration with a footprint about the same as that of the representative mechanical actuator assembly 701 described above (e.g., about the same footprint, a somewhat smaller footprint (e.g., 5-15% smaller) or somewhat larger (e.g., 5-15% larger) footprint).

The components of a mechanical actuator assembly of the present disclosure are designed carefully in order for the device to work reliably and as intended. The spring torque-to-volume ratio for the designed pull back (cocked) position of the impact member needs to be high enough to break the intended target (e.g., frangible sheet material) upon impact yet low enough to be held back without breaking the restraint member. Generally, the restraint member is relatively inelastic, strong under tension yet easily burnable with heat, and breaks instantly with heat as opposed to slowly stretching with a gradual decrease in Young's Modulus. In some implementations, the restraint member can be relatively elastic. In accordance with embodiments that include a resistor as a component of the trigger source, the resistor is preferably designed with a resistance value and power rating to generate high heat from a low-cost battery that last for a sufficient duration to break the restraint member.

Figure 9C:
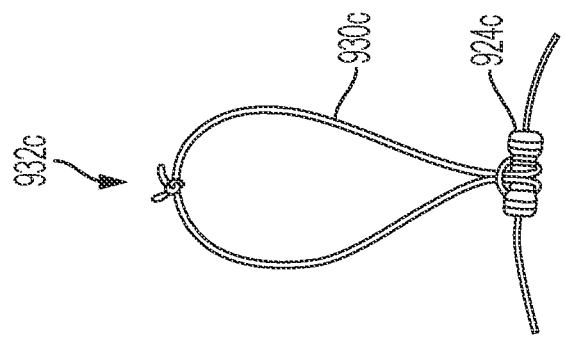
FIGS. 9A-9C show various embodiments for wrapping a resistor heater of a mechanical actuator assembly with a pre-looped string.
Figure 9B:
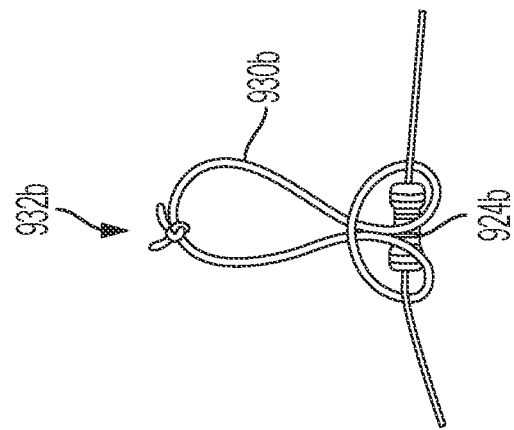
Figure 9A:
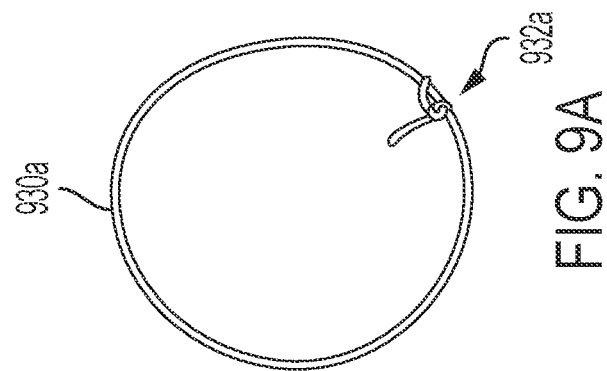

In accordance with embodiments that include tying a restraint member around a resistor such as the embodiment shown in FIG. 8, it is important that the resistor heater is not tied with more than one knot of the restraint member (e.g., string), as multiple knots can keep the string intact even if the wrapped portion of the string gives way upon heater activation. FIGS. 9A-9C show various embodiments for wrapping the resistor heater of a mechanical actuator assembly with a pre-looped string. These methods enable a simple and low-cost way to incorporate a resistor heater into the restraint loop. FIG. 9A shows a pre-looped string 930a with a single knot 932a. FIG. 9B shows a method for wrapping a resistor heater 924b by inserting the looped string 930b upon itself, such that the knot 932b is positioned away from the resistor heater 924b. FIG. 9C shows a resistor heater 924c incorporated into a string restraint with a residual loop 930c for tying down the spring member, such that the knot 932c is positioned away from the resistor heater 924c.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An apparatus, comprising:
    a structure comprising a predetermined breakable region;
    a mechanical actuator disposed at or proximate the predetermined breakable region, the mechanical actuator comprising:
        a spring arrangement and an impact member coupled to the spring arrangement; and
        a restraint member operably coupled to the spring arrangement; and
    a trigger source operably coupled to an electrical power source;
    wherein the trigger source, in response to receiving current from the electrical power source, is configured to release or break the restraint member so as to allow the spring arrangement to forcibly move the impact member into contact with, and break, the predetermined breakable region.

2. The apparatus of claim 1, wherein the trigger source comprises a heat source operably coupled to the electrical power source and in thermal contact with the restraint member.

3. The apparatus of claim 1, wherein the structure is frangible and configured to break in response to breaking of the predetermined breakable region.

4. The apparatus of claim 1, wherein the trigger source comprises at least one of an electrically resistive heater, an electric match, an arc lighter, a plasma lighter, a semiconductor laser, an electromagnetic device, and an electrostatic device.

5. The apparatus of claim 1, wherein the electrical power source comprises at least one of a battery, a DC power supply, an AC power supply, a supercapacitor, and an electro-magnetically-coupled charged source.

6. The apparatus of claim 1, wherein the spring arrangement comprises a torsion spring.

7. The apparatus of claim 1, wherein the spring arrangement comprises a spring steel member.

8. The apparatus of claim 1, wherein the spring arrangement comprises a spring element having a spring force sufficient to:
    maintain the impact member in a pre-actuation position without causing the restraint member to release or break; and
    cause the impact member to break the predetermined breakable region in response to releasing or breaking of the restraint member.

9. The apparatus of claim 1, wherein:
    the trigger source is mounted to a printed circuit board (PCB); and
    the PCB is affixed to a frame or a base of the mechanical actuator.

10. The apparatus of claim 1, wherein the trigger source comprises a resistor.

11. The apparatus of claim 10, wherein the resistor has a resistance ranging from about one-eighth of an internal impedance of the electrical power source to about V/P, where V is a voltage of the electrical power source and P is a minimum electrical power needed to break the restraint member.

12. The apparatus of claim 1, wherein the restraint member comprises a string.

13. The apparatus of claim 1, wherein the mechanical actuator comprises a mass load connected to or situated proximate the impact member.

14. The apparatus of claim 1, wherein the predetermined breakable region comprises a sheet of glass or a sheet of tempered glass.

15. The apparatus of claim 14, wherein the sheet of glass or the sheet of tempered glass has a thickness of up to about 2 mm.

16. The apparatus of claim 1, wherein:
    the predetermined breakable region comprises a void in the structure;
    a sheet of glass or tempered glass is disposed over the void; and
    one or both of a sealant adhesive and sealing tape is disposed at the predefined breakable region and one or both of under and over a periphery of the sheet of glass.

17. The apparatus of claim 1, wherein the electrical power source comprises an alkaline battery configured to supply a peak current of between about 0.6 A to about 3.5 A.

18. An apparatus, comprising:
    a container comprising a predetermined breakable region;
    a mechanical actuator disposed within the container and situated at or proximate the predetermined breakable region, the mechanical actuator comprising:
        a spring arrangement and an impact member coupled to the spring arrangement; and
        a restraint member operably coupled to the spring arrangement; and
    a heat source operably coupled to an electrical power source and in thermal contact with the restraint member;
    wherein the heat source, in response to receiving current from the electrical power source, is configured to break the restraint member so as to allow the spring arrangement to forcibly move the impact member into contact with, and break, the predetermined breakable region, thereby facilitating ingress or egress of a liquid, a gas or a solid into or out of the container.

19. The apparatus of claim 18, wherein:
    the predetermined breakable region comprises a void in the container;
    a sheet of glass or tempered glass is disposed over the void; and
    one or both of a sealant adhesive and sealing tape is disposed at the predefined breakable region and one or both of under and over a periphery of the sheet of glass or tempered glass.

20. The apparatus of claim 18, wherein:
    the trigger source comprises at least one of an electrically resistive heater, an electric match, an arc lighter, a plasma lighter, and a semiconductor laser; and the electrical power source comprises at least one of a battery, a DC power supply, an AC power supply, a supercapacitor, and an electro-magnetically-coupled charged source.

21. The apparatus of claim 18, wherein the spring arrangement comprises a torsion spring or a spring steel member.

22. The apparatus of claim 18, wherein the spring arrangement comprises a spring element having a spring force sufficient to:
    maintain the impact member in a pre-actuation position without causing the restraint member to break; and
    cause the impact member to break the predetermined breakable region in response to breaking of the restraint member.

23. An apparatus, comprising:
    a container configured for floatation in a liquid and comprising:
        a first predetermined breakable region at a first location of the container; and
        a second predetermined breakable region at a second location of the container spaced apart from the first location;
    a first mechanical actuator disposed within the container and situated at or proximate the first predetermined breakable region;
    a second mechanical actuator disposed within the container and situated at or proximate the second predetermined breakable region;
    each of the first and second mechanical actuators comprising:
        a spring arrangement and an impact member coupled to the spring arrangement;
        a restraint member operably coupled to the spring arrangement; and
        a trigger source configured to be, or move into, contact with the restraint member; and
    an electrical power source arrangement operatively coupled to the trigger source of each of the first and second mechanical actuators;
    wherein the trigger source of each of the first and second mechanical actuators, in response to receiving current from the electrical power source arrangement, is configured to release or break the restraint member so as to allow the spring arrangement to forcibly move the impact member into contact with, and break, the respective first and second predetermined breakable regions, thereby facilitating venting of air from the container via one of the broken first and second predetermined breakable regions and ingress of the liquid into the container via the other of the broken first and second predetermined breakable regions.

24. The apparatus of claim 23, wherein the electrical power source arrangement comprises:
    a first electrical power source operatively coupled to the first mechanical actuator; and
    a second electrical power source operatively coupled to the second mechanical actuator.

25. The apparatus of claim 23, wherein:
    the container is configured for floatation in a body of water; and
    activation of the trigger source of each of the first and second mechanical actuators causes scuttling of the container.

26. The apparatus of claim 23, wherein:
    one of the first and second locations of the container is above a predetermined waterline of the container to facilitate venting of air from the container; and
    the other of the first and second locations of the container is below the predetermined waterline of the container to facilitate ingress of the liquid into the container.

27. The apparatus of claim 23, comprising one or more ballasts configured to distribute weight within the apparatus such that one of the first and second locations of the container is oriented above the predetermined waterline of the container to facilitate venting of air from the container during liquid ingress.

28. The apparatus of claim 23, wherein:
    the container is configured for floatation in a body of water; and
    all or a portion of an external surface of the container comprises an anti-biofouling chemical coating.

\* \* \* \* \*